United States Patent [19]
Dove et al.

[11] Patent Number: 6,082,861
[45] Date of Patent: Jul. 4, 2000

[54] OPTICAL SYSTEM AND METHOD FOR HIGH CONTRAST PROJECTION DISPLAY

[75] Inventors: Derek B. Dove, Mt. Kisco; Alan Edward Rosenbluth, Yorktown Heights, both of N.Y.

[73] Assignee: International Business Machines Corporation, Armonk, N.Y.

[21] Appl. No.: 09/153,538

[22] Filed: Sep. 16, 1998

[51] Int. Cl.[7] .................................................. G03B 21/14
[52] U.S. Cl. ............................. 353/20; 353/122; 353/69
[58] Field of Search ................................... 353/8, 20, 31, 353/33, 34, 37, 122, 69; 349/8, 9, 18

[56] References Cited

U.S. PATENT DOCUMENTS

| | | | |
|---|---|---|---|
| 4,906,073 | 3/1990 | Hunahata et al. | |
| 5,541,673 | 7/1996 | Shioya et al. | 353/20 |
| 5,621,486 | 4/1997 | Doany et al. | 353/34 |
| 5,772,299 | 6/1998 | Koo et al. | 353/20 |
| 5,829,852 | 11/1998 | Jung | 353/20 |
| 5,875,008 | 2/1999 | Takahara et al. | 353/34 |

*Primary Examiner*—William Dowling
*Attorney, Agent, or Firm*—David M. Shofi

[57] ABSTRACT

An optical system for a projection display includes one or more polarizing beam splitters, one or more reflective light valves disposed to receive light transmitted through the one or more splitters and one or more phase correcting members, each disposed between the one or more splitters and the one or more light valves, whereby contrast of the display is substantially improved.

16 Claims, 8 Drawing Sheets

OPTICAL SYSTEM AND METHOD FOR HIGH CONTRAST PROJECTION DISPLAY

FIELD OF INVENTION

The present invention relates a projection display system. More particularly, the present invention relates to an improvement in the optical system for a projection display using reflection liquid crystal light valves.

BACKGROUND OF THE INVENTION

There is considerable interest today in large screen displays for computer, business and entertainment applications. Light valves fabricated using silicon chip technology combined with liquid crystal electro-optic properties are a major contender for this market. These devices require polarized light and careful design of the optical projection system.

Figure 1:
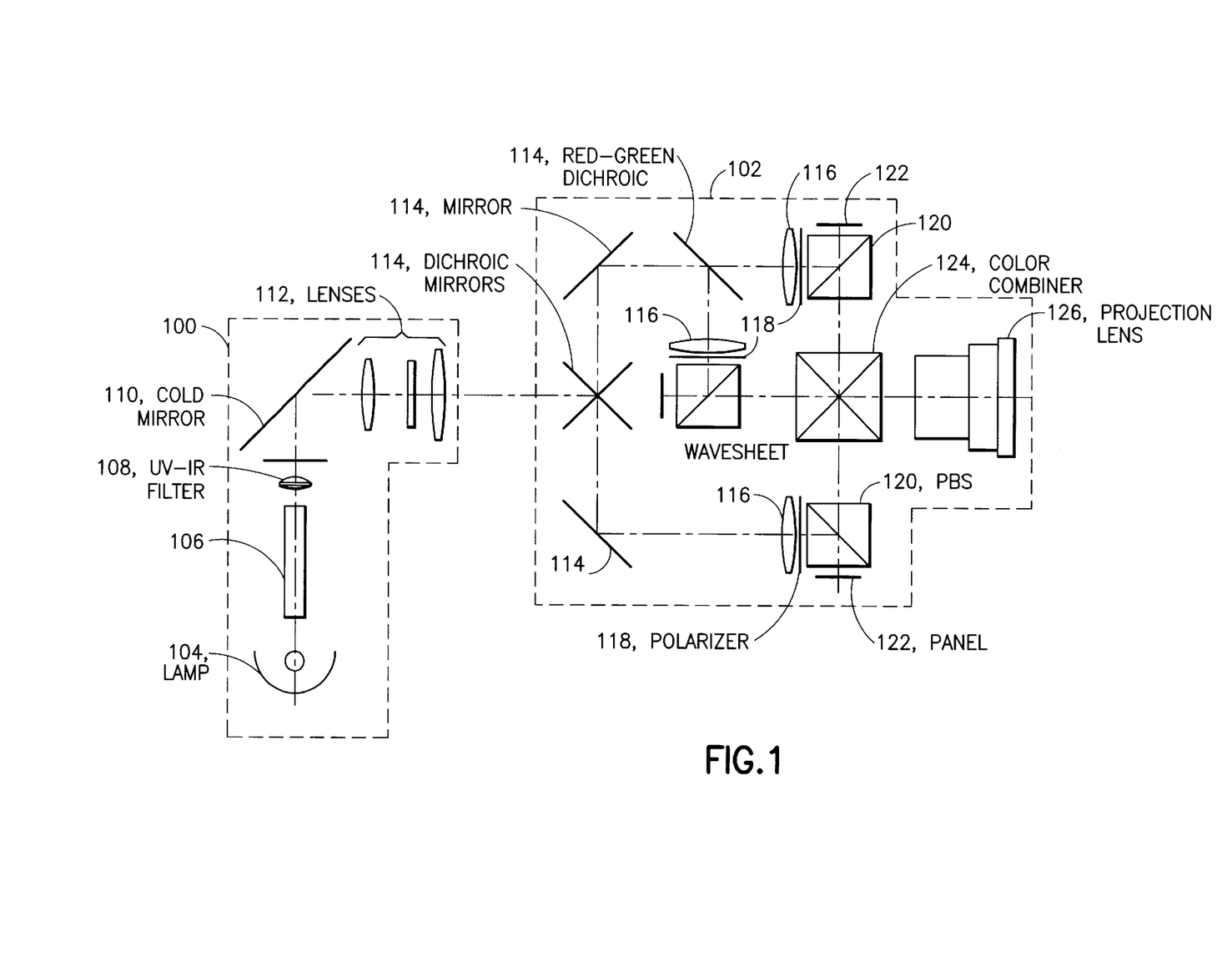
FIG. 1 shows a conventional optical system for a projection display utilizing silicon chip-based liquid crystal light valves.

FIG. 1 shows a typical optical system for a projection display utilizing silicon chip based liquid crystal light valves. The system includes an illumination system 100 and a projection optics system 102. The illumination system includes a lamp 104 which acts as the light source, a homogenizer (or integrator) 106 which evens out the illumination from the lamp 104 for uniformity of light on the display screen, a filter 108 which filters out ultra-violet (UV) and infrared (IR) light components, a mirror 110 which reflects the light toward the projection optics system 102 and eliminates residual IR light, and a series of lenses 112 which image the light for focus and magnification onto the light valves. The projection optics system 102 includes various mirrors 114 which isolate the red, green and blue components of the light, lenses 116 for imaging the light, polarizer sheets 118 for ensuring that the incident light is polarized in the correct direction, polarizing beam splitters (PBS) 120 together with reflective light valves 122 for controlling the light components, a color combiner 124 for redirecting light where necessary, and a projection lens 126 which focuses the light emitted from the color combiner 124 onto a distant screen (not shown).

Figure 2:
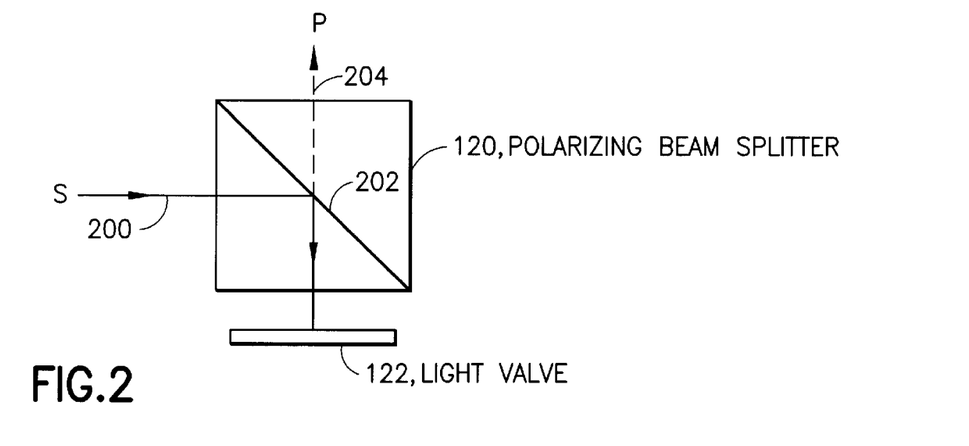
FIG. 2 shows a conventional polarizing beam splitter (PBS) that directs onto the light valve.

FIG. 2 shows a reflective light valve 122 used in conventional combination with a PBS 120. The PBS 120 has the function of directing light of a particular polarization onto the light valve 122. The PBS 120 separates light according to its direction of polarization. The polarization (s polarization) of the incident light beam 200 is reflected by the dichroic surface 202 of the PBS 120 onto the light valve 122. The most common class of light valves in use today are based on polarization modulation, such as those using twisted nematic liquid crystal (TNLC). In reflective mode, these light valves neither absorb nor scatter the incident light. Application of a voltage to a light valve causes the polarization of the reflected (p polarization) beam to rotate and, therefore, to be transmitted through the PBS. Light reflected from regions where the applied voltage is zero remains in the original (s) polarization and, thus, is reflected back to the source. For this reason, light that remains in the original (s) polarization cannot contribute to the image. An alternative arrangement could be designed such that the incident light beam could be a p polarization beam operating in transmission through the PBS and the reflected beam could be an s polarization beam if rotated. In that case, the beams would be illustrated in the reverse of that of FIG. 2.

Thus, in FIG. 2, where the light valve 122 is normally in the dark state and no voltage is applied thereto, the s polarization light beam 200 is reflected back toward the source.

When a voltage is applied to the light valve 122, the polarization direction of the light beam is rotated into a p polarization light beam 204 which is transmitted through the PBS 120 toward the screen (not shown). Thus, in a projection display that uses reflective light valves, s polarization and p polarization beams must both propagate in the space between the PBS and the light valve.

With normally white light valves, the polarization is rotated when the applied voltage is zero. When a voltage is applied to the light valve, the beam is reflected with some polarization. Only near maximum voltage is the beam reflected without rotation of polarization. In any case, whether the light valve is normally white or normally black, light that remains in the original polarization will be returned to the source. That is, light that is unmodified by the light valve is, thus, prevented by the PBS from reaching the screen.

Typically, the illumination produces a light beam where individual rays lie within a range of angles about a principal direction (shown in FIGS.). For rays that are at an angle from the principal ray shown in FIG. 2, the dark state includes a particular orientation of the rays, as well as their polarization. Regions of the light valve that display black patterns will reflect light in the dark state, while regions set at maximum brightness will produce a reflected beam in the rotated bright state polarization. The optical system must contain an element like the PBS to separate the bright state from the dark state light. The PBS passes bright state light through the projection lens to form bright areas of the screen image. Black areas of the image contain no light since dark state light is removed by the PBS. In some cases, like that shown in FIGS. 1 and 2, the hypotenuse coating of the PBS is the only tilted coating to which both polarizations in the reflected beam are directed. By the time the reflected beam reaches other tilted coatings, the PBS has already removed the dark state light. In other cases, such as the example shown in FIG. 7, there may be several tilted coatings that see both bright and dark state polarizations. For good contrast, it is necessary that dark-state polarized rays remain entirely in the dark state as they propagate through all tilted coatings. If small amounts of light from dark-switched regions are converted to bright state, the mispolarized light will be passed by the PBS, producing background intensity in nominally black regions of the image. While supplementary sheet polarizers are a known method for filtering out light that gets converted to the wrong polarization, these devices cannot be employed where both polarization states must be allowed to propagate.

The ratio of the amount of light reaching the screen when the light valve is activated to the small unwanted leakage of light through the polarizing beam splitter when the screen should be dark, largely determines the display image contrast that the projector may achieve. This is an important quality factor for the user.

It is understood, in the prior art, that light leakage is related to geometric effects associated with rays passing through the tilted coatings in the optical system at an angle to the principal axis. See A. E. Rosenbluth et al., "Contrast Losses in Projection Displays from Depolarization by Tilted Beam Splitter Coatings," in *Proceedings of 1997 International Display Research Conference* (Toronto: Society for Information Display, 1997), p. 226 ("Contrast Losses"); A. E. Rosenbluth et al., "Contrast Properties of Reflective Liquid Crystal Lightvalves in Projection Displays," *IBM Journal of Research and Development* 42, no. 3/4 (1998), pp. 359–386 ("Contrast Properties") which are hereby incorporated by reference. If the ray angle has a skew component relative to the tilt in the surface, its plane of incidence will be different from that of the principal ray due to the compound angle involved. In the case of the principal ray, the electric field will be entirely parallel or entirely perpendicular to the plane of incidence, but this will not be true of skew rays. For this reason, tilted coatings will usually change the polarization of rays with a nonzero skew component, causing polarization cross-talk. Typically, the rays illuminating a light valve must occupy a range of angles (~10°) so that a beam derived from a thermal source (e.g., arc lamp) contain enough energy to provide competitive brightness. The necessary angular range can be decreased if beam diameter is increased, but this runs counter to the goals of compactness and cost minimization with use of small components. For beams subtending angles ~10°, the compound angle depolarization of skew rays is often the dominant factor limiting full-screen contrast.

Figure 3:
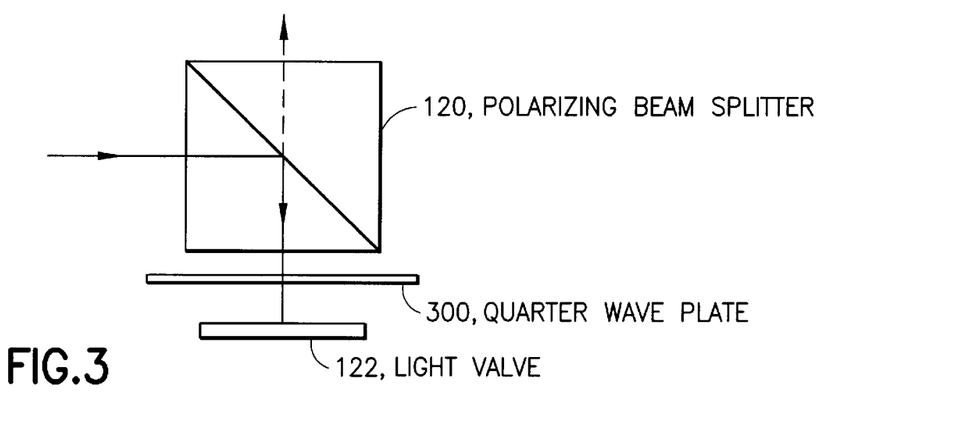
FIG. 3 shows a conventional quarter wave plate for improving contrast in the polarizing beam splitter/light valve optical system.

A method is known in the prior art for correcting this compound angle effect in the following special case: When the polarizing coating on the PBS hypotenuse is the only tilted coating that both polarizations pass through, as in FIGS. 1 and 2, and when the light valve is mirror-like in the dark state, it is known that compound angle depolarization may be corrected by disposing a quarter wave plate 300 between the polarizing beam splitter 120 and the light valve 122, as shown in FIG. 3. Two passes through the quarter wave plate 300 eliminates angular geometrical depolarization. This is further shown in European Patent No. 389,240 entitled "Polarizing beamsplitter apparatus and lightvalve image projection system," issued 1990 to Y. Miyatake and assigned to Matsushita Electric Industrial Co. ("Miyatake").

Figure 4:
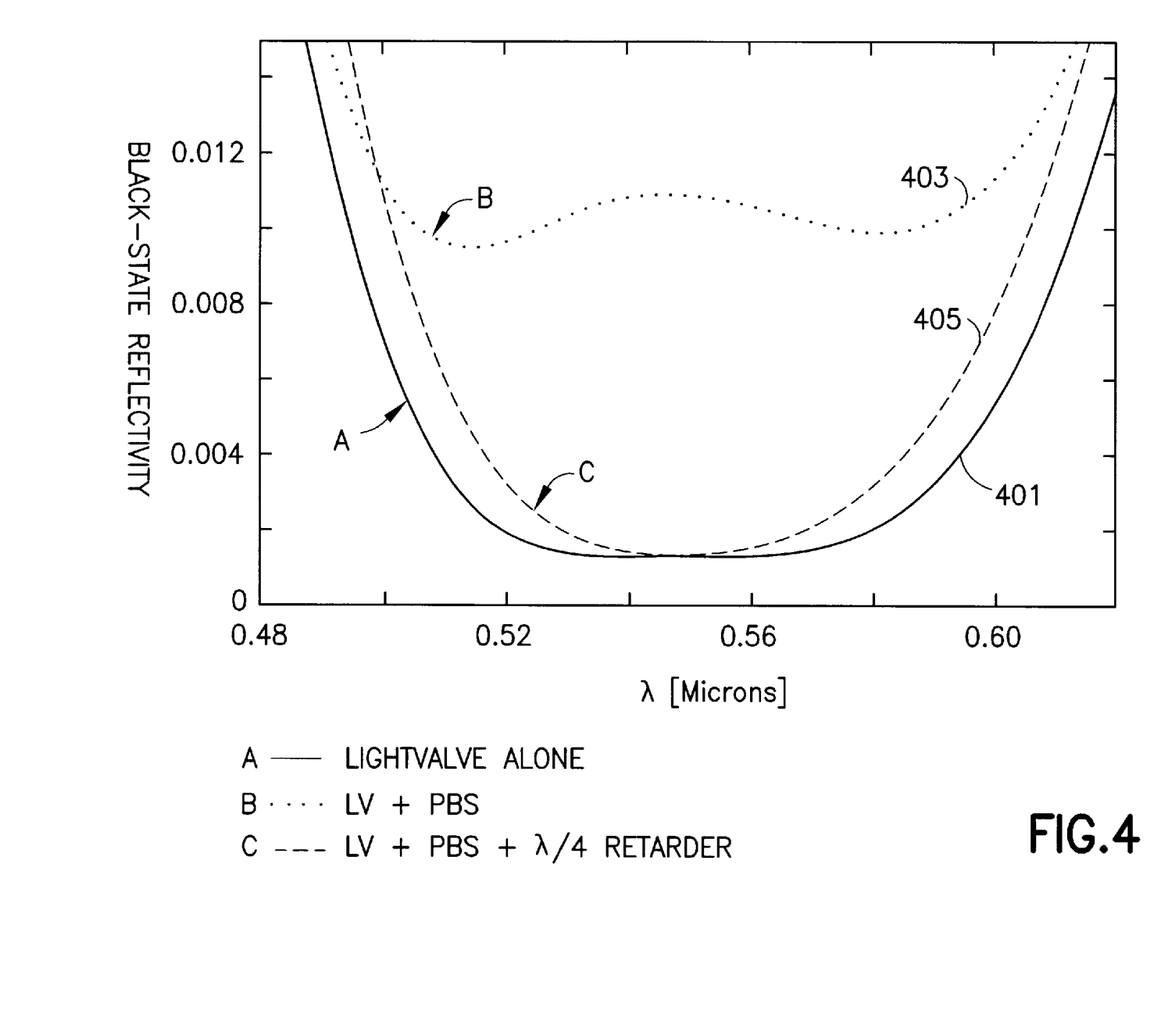
FIG. 4 shows the black state reflectivity plotted along the green light spectrum with the light valve alone, the light valve and the PBS of FIG. 2 and the light valve, PBS and quarter wave plate of FIG. 3.

The conventional quarter wave plate method has several deficiencies, however. First, as noted, it is only applicable in the case of PBS cube systems like that in FIGS. 1 and 2 where no other tilted coatings are present between the light valve and the PBS. Thus, it is not effective in the case of more complex optical systems like that shown in FIG. 7. Second, many light valves are not precisely mirror-like in the dark state. That is, they have optical properties that vary with wavelength so that the quarter wave plate is not effective for all wavelengths. One difference is that the light valve may itself exhibit imperfect contrast, i.e. it may introduce a small amount of depolarization in the incident light. In a high quality light valve, this depolarization (denoted $B_{LV}$) is small. For example, curve A 401 in FIG. 4 shows the black state reflectivity (reflectivity intensity toward the screen in the dark state) of a twisted nematic light valve designed to operate in the green channel of a projector, as discussed in Contrast Losses and in K. H. Yang and M. Lu, "Nematic LC Modes and LC Phase Gratings for Reflective Spatial Light Modulators," *IBM Journal of Research and Development* 42, No. 3/4 (1998), p. 401–410. An incoherent contribution to background of 1 part in 800 is assumed for purposes of illustration. Except for this incoherent scatter, the light valve is mirror-like at the central green wavelength of 550 nm, and the black state intensity is 1/800th that of full intensity green. At other green wavelengths, the light valve is not mirror-like and $B_{LV}$ (curve A) is larger than 1/800. However, integrated over the green band between about 510 nm and 590 nm, the light valve black state contribution is reasonably small in comparison with a typical system contrast requirement, which might, for example, be 300:1. The contrast of the light valve is, thus, reasonably good, but unfortunately, as will be discussed further hereinbelow, there is an interaction between a reflective polarizing light valve and projection optical systems which almost always causes the contrast of the complete projector to be poorer than that of the light valve alone.

Curve A in FIG. 4 assumes that the TNLC light valve is illuminated with light that is linear polarized in an optimum direction (dark state polarized). Because of depolarization introduced by the optical system, the illuminating light may not actually achieve such a pure polarization state. This depolarization does not involve the light valve, but if the light valve is not mirror-like, it may contribute a further depolarization, and also a retardance, i.e. a differential phase shift between the two illuminating polarization components, producing effects not seen in curve A of FIG. 4. The end result is that, in a projector, the contrast is almost always poorer than curve A, i.e. the residual black state intensity of the system is almost always larger than that of the light valve alone.

As noted above, the PBS introduces a depolarization in rays that have a skew component of incidence at the tilted hypotenuse coating. If the light valve in FIG. 2 is replaced with an analyzing polarizer that is crossed to the pass direction of the PBS (pass polarization is S, analyzer is set to P), the depolarization of the PBS can be measured in single pass. For a uniform cone of rays subtending an angle NA, the transmitted single-pass intensity is given by $(NA/2n)^2$, where n is the refractive index of the PBS substrates. Customarily, NA denotes the sine of the cone angle, but for cone angles ~10°, the distinction is numerically small. Using NA=0.167 and n=1.7, the single-pass black state contribution of the optics, denoted $B_{Optics}$, is thus about 1/400(where unity represents full bright state intensity). The single pass PBS depolarization, $B_{Optics}$, thus does not exceed the 300:1 system contrast requirement assumed here for purposes of illustration.

However, a much larger background occurs in the projection system, where the PBS is traversed in double pass by the light, preceding and following reflection from the light valve. Black state reflectivity in this case (denoted $B_{System}$) is plotted as curve B 403 in FIG. 4 for the TNLC light valve whose black state is curve A 401. Black state light leakage in the green band is seen to be about 1 part in 100. While this poor system performance can be considerably improved by placing a quarter wave plate 300 above the light valve, as per FIG. 3, reducing the black state reflectivity to the level plotted as curve C 405 in FIG. 4, the contrast is not as high as is achieved by the light valve alone (curve A 401). Moreover, if the NA of the system is increased for better light collection, the excess black state intensity in curve C 405 increases quadratically. It is desirable that the dark state intensity be as low as possible for good contrast, but at the same time, the cone of rays should be as large as possible to transfer as much light as possible through the system. Subject to constraints of proper primary chromaticity, it is also desirable that a broad band of wavelengths be included in each color channel, since this also increases brightness (with a thermal source). The curve C 405 intensity rises as wavelength deviates from the central wavelength. Because each light valve must work with a range of wavelengths within a color band, not just at a single wavelength, interaction between the light valve and optical system results in appreciable black state light leakage.

Therefore, there is a need for a system and method for realizing the high contrast obtainable with reflective polarization-modulating light valves when the light valves are used in a projection system.

SUMMARY OF THE INVENTION

The present invention includes the introduction of a phase correcting plate between the optical system and the liquid crystal light valve which results in significant improvement of the contrast ratio of the projection system over the conventional quarter wave plate method.

The present invention also includes an optical method for providing a greatly improved contrast between light and dark regions in the image produced by the projector, leading to improved displays for computer, entertainment, business and other applications. This method may be applied to any display where a reflective light valve and prism optics can be employed including displays projecting a virtual image.

This present invention provides a method for considerably improving the contrast of such displays by using a phase correcting wave plate to improve the interaction between the light valve and the optical system.

BRIEF DESCRIPTION OF DRAWING

The present invention will be understood by reference to the drawing, wherein.

DETAILED DESCRIPTION OF THE PREFERRED EMBODIMENT

The key difficulty in achieving high contrast in a projection system incorporating high contrast light valves can be understood from the following equation:

$$B_{System} = B_{LV} + 4B_{Optics}(1-B_{LV})\sin^2(\Lambda_{LV}+\Lambda_{Optics}). \quad [1]$$

As noted above, $B_{System}$ denotes projector black level, $B_{LV}$ denotes the black level of the light valve, and $B_{optics}$ denotes the single-pass black level produced by the projection optics alone, as measured between crossed polarizers. As described hereinbelow, the phase correcting plate of the present invention may be counted either as part of the optical system or as part of the light valve. These black levels are non-zero whenever the light valve or optics exhibits non-zero depolarization. When an element that does not depolarize is illuminated by a dark state ray with an electric field represented by Jones vector (0,1), the output ray will remain in the dark state, i.e. the Jones vector for the output ray will remain (0,1). The physical basis directions for the electric field components may be different in the input and output spaces. On the other hand, when the system or element is depolarizing, the output depolarization is a complex quantity defined as $$D \equiv E_1/E_2 \quad [2]$$

where $E_1$ and $E_2$ are the elements of the output Jones vector $(E_1, E_2)$. Though the input polarization is linear, the output polarization $(E_1, E_2)$ is, in general, rotated and elliptical. If purely rotated, D is real while if purely elliptical, D is imaginary.

The phase variables appearing in equation [1] are related to the depolarization by:

$$\Lambda_{optics} \equiv \text{Phase}[D_{Optics}]$$

$$\Lambda_{LV} \equiv \text{Phase}[D_{LV}]. \quad [3]$$

Note that the phase $\Lambda_{LV}$ of the reflective light valve appearing in equations [1] and [3] is defined as the phase of the light valve depolarization, which is slightly different from the phase of the light valve retardation. The Jones matrix of a retarder with retardation phase $\Phi$ is $$M_{Retarder} = \begin{pmatrix} e^{i\Phi/2} & 0 \\ 0 & e^{-i\Phi/2} \end{pmatrix} \quad [4]$$

To calculate $\Lambda_{LV}$ in the special case where $D \rightarrow 0$ (as in equation [4]), it can be shown that, with a reflective light valve, it is permissible to assume an infinitesimal pure real off-diagonal element in the Jones matrix. From equations [2] and [4], it follows that, in the hypothetical case of a reflective light valve whose Jones matrix is equivalent to a retarder per equation [4], the phase $\Lambda_{LV}$ of the depolarization is $\Phi/2$. In other words, $\Lambda_{LV}$ differs from the retardation phase $\Phi$. For the same reason, the phase shift $\Lambda_{LV}$ for a mirror-like light valve is equal to 900, rather than to the 180° phase shift associated with a mirror-reversal operation. In the general case, the phase shift of the depolarization should be used in equation [1], not the retardation phase split between the diagonal matrix elements.

Because black-state intensities are usually small compared to bright state intensities, $B_{LV}$, $B_{Optics}$ and $B_{System}$ will usually be small compared to 1. Thus, the factor $(1-B_{LV})$ appearing in the second term of equation [1] can often be neglected. However, since diagnostic light valve spectra often include wavelengths far outside the normal operating range, equation [1] is written in a form that is valid for large light valve depolarization $D_{LV}$. The relationships between depolarization and black state intensity are:

$$B_{Optics} \cong |D_{Optics}|^2 \quad [5]$$

$$B_{LV} = \frac{|D_{LV}|^2}{1+|D_{LV}|^2}.$$

The PBS shown in FIG. 2 causes depolarization by rotating the e-field of incident skew rays. That is, the output plane of polarization rotates to follow the tilted planes of incidence. Depolarization in the PBS is, therefore, purely rotational. $D_{Optics}$ is, thus, purely real and $\Lambda_{Optics}$ is 0. For a light valve that is mirror-like in the dark state, $B_{LV}$ is 0, and, as noted above, $\Lambda_{LV}$ is 90°. Under these conditions the $\sin^2$ term in equation [1] is equal to unity, and the black state intensity of the system is given by $$B_{System} = 4B_{Optics} \quad [6]$$

In the optical system shown in FIG. 2, the single-pass black level is $B_{Optics} = (NA/2n)^2$. Hence, with a mirror-like light valve and a simple PBS system, the double-pass projector black state of equations [1] and [6] becomes $$B_{System} = (NA/n)^2. \quad [7]$$

The corrective action of the conventional quarter wave plate (FIG. 3) is usually described in terms of a step-by-step geometrical effect on the incident and reflected electric fields. See Miyatake. However, the corrective effect is easily established from equation [1]. The quarter wave plate shifts the phase $\Lambda_{Optics}$ of the PBS from 0 to 90°. When this phase is added to the 90° phase shift of a mirror-like light valve, the argument of the sine in equation [1] becomes 180°, and $B_{System}$ goes to 0. The quarter wave plate corrector is, thus, perfectly effective under these conditions.

However, complete correction is not obtained when the optical system phase shift $\Lambda_{Optics}$ is other than 0, as in the FIG. 7 optical system referenced hereinbelow, or when the light valve phase shift $\Lambda_{LV}$ is other than 90°. In general, the second term of equation [1] will be nonzero, and the optical system and light valve will interact coherently.

TNLC reflective light valves in dark-state are usually only equivalent to mirrors at a single wavelength in the operating range. At other wavelengths, the phase shift departs from 90°. These light valves were first analyzed by Lu and Saleh in K. Lu and B. E. Saleh, "Complex Amplitude Reflectance of the Liquid Crystal Light Valve," *Applied Optics* 30, No. 17 (1991), p. 2354. See also Yang and Lu. The Jones matrix for these light valves is:

$$M_{LV} = \begin{pmatrix} -i\left[1 - \frac{2\beta^2 \sin^2\gamma}{\gamma^2}\right] + \beta\sin2\frac{\gamma}{\gamma} & \frac{2\alpha\beta\sin^2\gamma}{\gamma^2} \\ -\frac{2\alpha\beta\sin^2\gamma}{\gamma^2} & i\left[1 - \frac{2\beta^2 \sin^2\gamma}{\gamma^2}\right] + \beta\sin2\frac{\gamma}{\gamma} \end{pmatrix} \quad [8]$$

Equation [8] uses the notation of Lu and Saleh. That is, $\alpha$ is the LC twist angle and $\beta$ is the normalized birefringence $\beta \equiv \pi d(n_e - n_o)/\lambda$, with $n_e$ and $n_o$ the refractive indices of the ordinary and extraordinary rays respectively. d is the LC thickness and $\gamma$ is defined as $$\gamma \equiv \sqrt{\alpha^2 + \beta^2}.$$

Multiplying equation [8] by an input Jones vector (0,1) and applying equations [2] and [3], the black state intensity and phase of depolarization are given by:

$$B_{LV} = \left(\frac{2\alpha\beta\sin^2\gamma}{\gamma^2}\right)^2 \quad [9]$$

$$\Lambda_{LV} = -\arctan\left(\frac{\alpha^2 + \beta^2\cos2\gamma}{\gamma\beta\sin2\gamma}\right) \quad [10]$$

As indicated hereinabove, typical values for $B_{LV}$ are plotted as curve A in FIG. 4, with an added 0.00125 incoherent background to take into account factors outside the model.

The cell gap d is chosen such that, at a central wavelength in the operating range, parameter $\gamma$ is equal to $\pi$. At this single wavelength, $B_{LV}$ is 0 and $\Lambda_{LV}$ is 90°. When $\Lambda_{Optics}$ is also 90°, as with the quarter wave plate and PBS implementation of FIG. 3, equation [1] predicts that the system black state intensity achieves the ideal value of 0. At other wavelengths, equation [1] becomes:

$$B_{System} = \left(\frac{2\alpha\beta\sin^2\gamma}{\gamma^2}\right)^2 + \frac{NA^2}{n^2}\left(\beta\sin2\frac{\gamma}{\gamma}\right)^2 \quad [11]$$

In FIG. 4, curve C shows $B_{System}$ where NA=0.167. The first term in equation [1] is the equation [9] black state $B_{LV}$ of the light valve alone. The second term represents a degradation in performance that obtains even after the prior art quarter wave plate is implemented.

To obtain improved performance, to a reasonable approximation the Jones matrix of any projection system in which all tilted coatings are tilted about a common axis can be written:

$$M_{Optics} = \begin{pmatrix} e^{i\Sigma/2} & P\theta e^{-i\Sigma/2} \\ -P^*\theta e^{i\Sigma/2} & e^{-i\Sigma/2} \end{pmatrix}. \quad [12]$$

Here, $\theta$ is the skew angle component of a particular ray. According to equation [12], the phase shift $\Lambda_{Optics}$ produced by the optical system is simply the phase of parameter P (or of P$\theta$). The depolarization P$\theta$ can be calculated from the phase shifts and orientations of the tilted surfaces in the optics using, for example, equation 22 in Contrast Properties. The global phase parameter $\Sigma$ cancels out in calculating the depolarization. Alternatively, the depolarization may be calculated by using standard polarization ray-trace methods (e.g., in E. Waluschka, "A Polarization Ray Trace," *Opt. Eng.* 28 (1989), pp. 86–89) to calculate the e-field of each ray. Note that equation 22 in Contrast Properties directly propagates the depolarization through the optical system. According to equation [1] above, the depolarization is the quantity of direct physical interest in the problem at hand.

Figure 5:
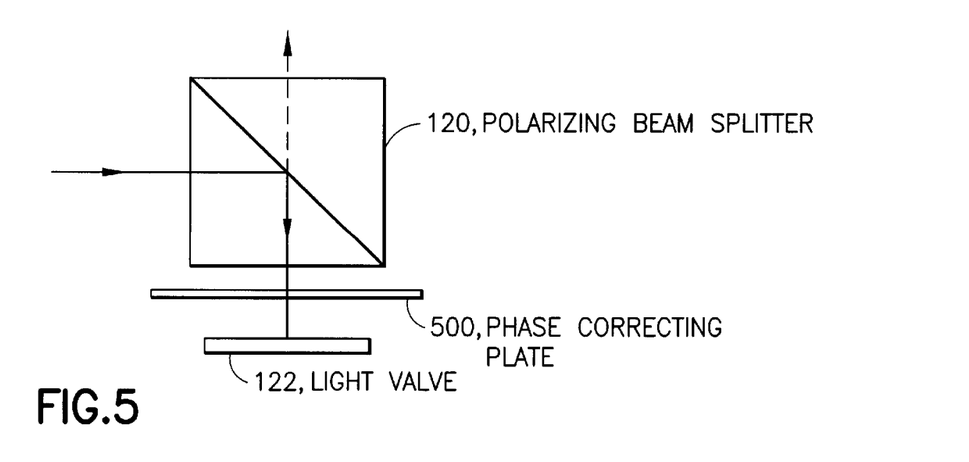
FIG. 5 shows the phase correcting plate of the present invention placed between a PBS and a liquid crystal light valve.

The present invention is shown in FIG. 5 wherein a phase correcting plate or retarder 500 is disposed between the PBS 120 and the light valve 122 of the optical system.

Adding this phase correcting plate 500 of phase $\Phi$ (which, preferably, varies with wavelength in a designed manner) provides that, from equations [4] and [12], the phase shift produced by the new optical system is:

$$\Lambda_{Optics+Retarder} = \Lambda_{Optics} + \Phi, \quad [13]$$

where, for simplicity, the phase correcting plate or retarder is counted as part of the optical system. Equation [1] becomes $$B_{System} = B_{LV} + 4B_{Optics}(1 - B_{LV})\sin^2(\Lambda_{LV} + \Lambda_{Optics} + \Phi). \quad [14]$$

To minimize black state intensity, equation [14] shows that the plate retardance should be chosen according to:

$$\Phi_{Optimum} = -(\Lambda_{LV} + \Lambda_{Optics}). \quad [15]$$

Equation [15] teaches how the phase correcting plate of the present invention is to be designed so that the leakage light is limited only by the properties of the light valve itself. The interaction term in equation [14] is eliminated because the $\sin^2$ factor is driven to zero. This results in a considerable reduction in light leakage across the range of wavelengths in each color band. These phase correcting plates could, for example, consist of a series of birefringent layers of suitable dispersion and orientation placed in juxtaposition to one another.

Figure 6:
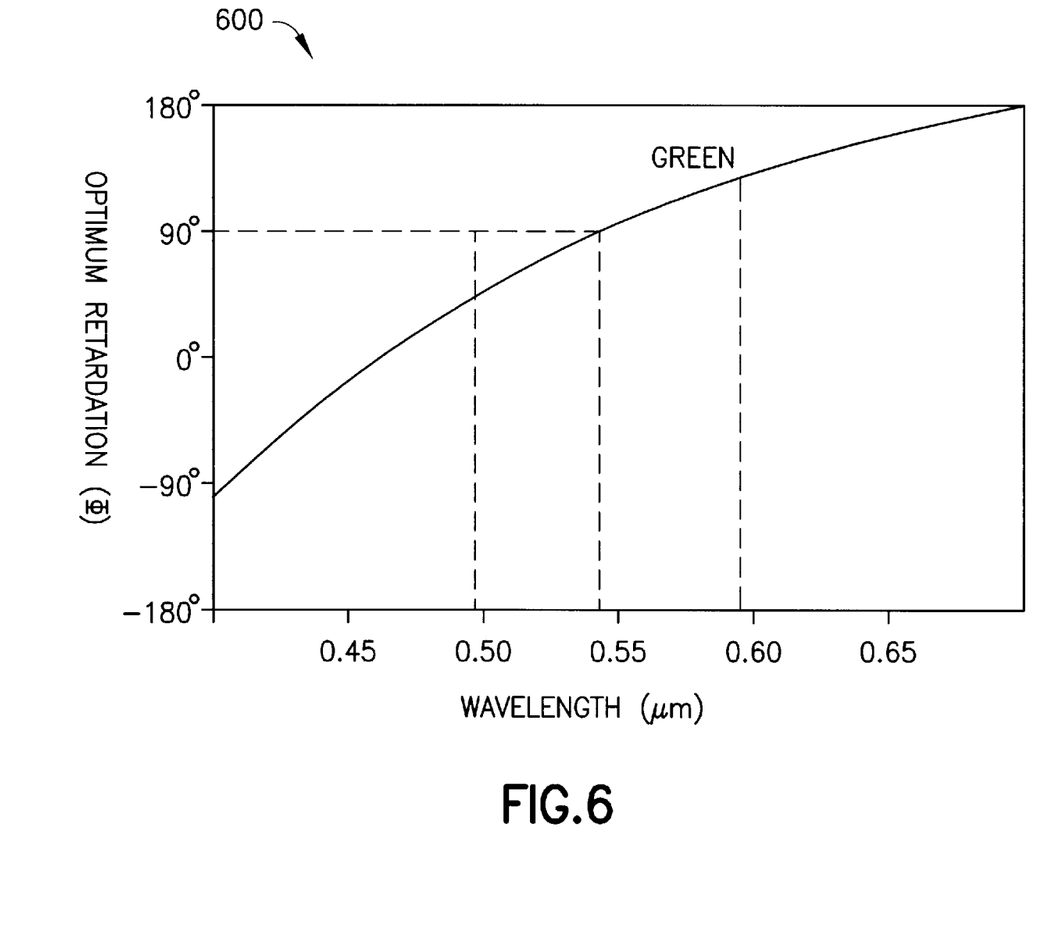
FIG. 6 shows a set of phase shifts that provide high contrast when the phase correcting plate of FIG. 5 is used with a twisted nematic liquid crystal light valve in the green channel of the FIG. 1 projector.

FIG. 6 shows a plot 600 of the equation [15] optimum phase shift (retardation $\Phi$) in the case of a PBS optical system and a green TNLC light valve as a function of wavelength for the green band. In this case, $\Lambda_{Optics}$ is 0 and $\Lambda_{LV}$ is given by equation [10]. The dispersive LC birefringence $\Delta n$ assumed in the FIG. 6 calculation is shown in the following table:

| Wavelength (microns) | $\Delta n$ | Wavelength (cont) | $\Delta n$ |
|---|---|---|---|
| 0.405 | 0.24213 | 0.555 | 0.20833 |
| 0.415 | 0.23985 | 0.565 | 0.20660 |
| 0.425 | 0.23749 | 0.575 | 0.20497 |
| 0.435 | 0.23508 | 0.585 | 0.20343 |
| 0.445 | 0.23263 | 0.595 | 0.20197 |
| 0.455 | 0.23018 | 0.605 | 0.20059 |
| 0.465 | 0.22773 | 0.615 | 0.19927 |
| 0.475 | 0.22531 | 0.625 | 0.19801 |
| 0.485 | 0.22293 | 0.635 | 0.19679 |
| 0.495 | 0.22061 | 0.645 | 0.19559 |
| 0.505 | 0.21835 | 0.655 | 0.19440 |
| 0.515 | 0.21617 | 0.665 | 0.19321 |
| 0.525 | 0.21407 | 0.675 | 0.19198 |
| 0.535 | 0.21206 | 0.685 | 0.19069 |
| 0.545 | 0.21000 | 0.695 | 0.18933 |

While the present invention is shown with regard to the green case, one skilled in the art will appreciate that the red and blue cases can also be calculated in the same manner. Thus, the system of FIG. 1 can be made to include three different phase correcting plates according to the present invention to greatly improve overall contrast.

Furthermore, while the present invention has been described with reference to a TNLC light valve, one skilled in the art will appreciate that the same principle can be applied to other types of liquid crystal light valves. More generally, the present invention can be applied to more complicated optical systems in which additional optical elements exist between the PBS and the light valves.

Figure 7:
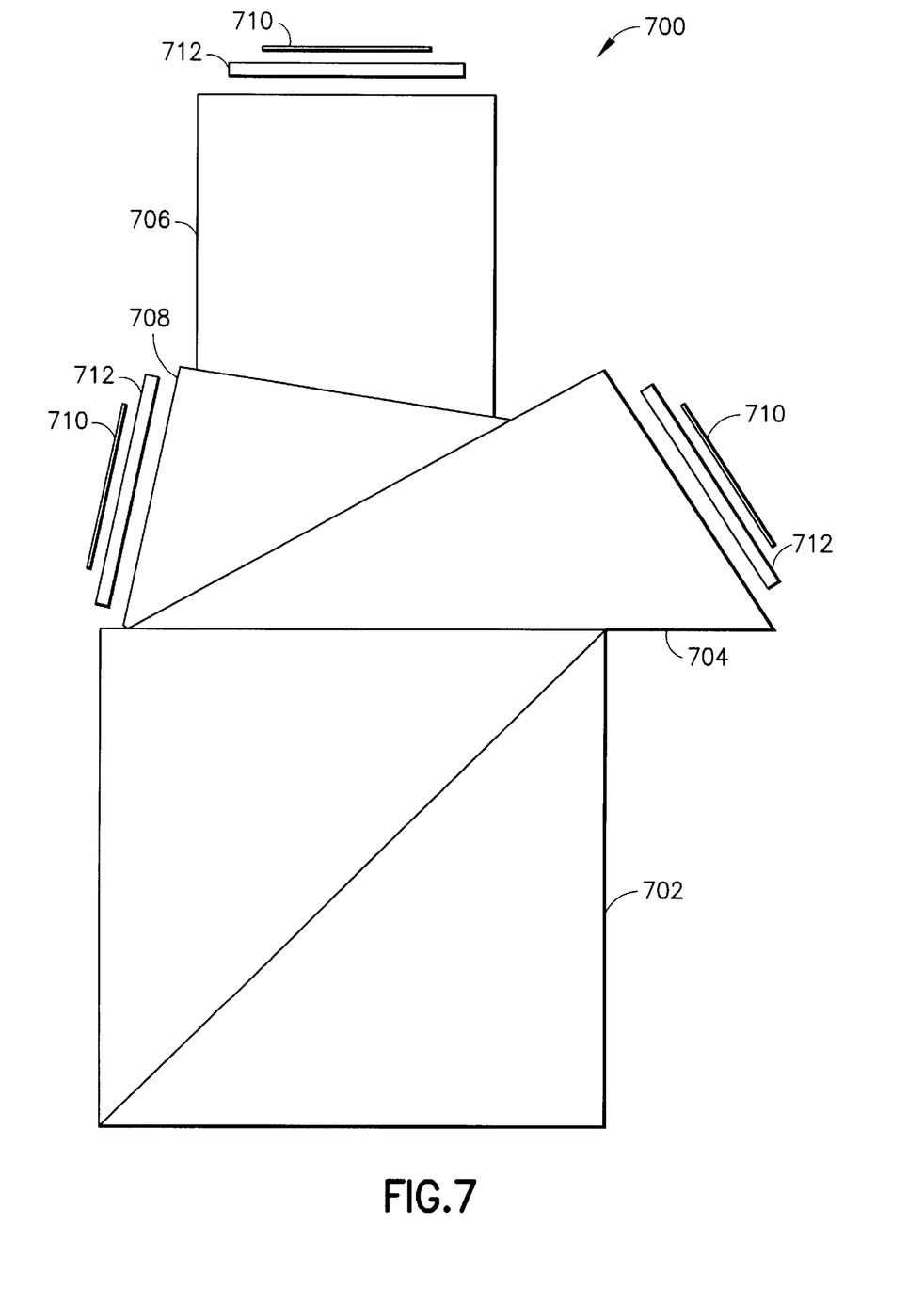
FIG. 7 shows an optical system using the phase correcting plate of the present invention to correct contrast loss arising from multiple tilted coatings.

For example, the present invention can be applied to correct the optical system 700 shown in FIG. 7 in which there are several tilted coating surfaces to which light is directed. The optical system 700 includes a common PBS 702 and three prisms 704, 706 and 708 for each light component. Each prism has a light valve 710 and a phase correcting plate 712 according to the present invention disposed between the prism and the light valve. The prisms function to separate the light which emanates from the PBS 702 onto the respective light valves and to recombine the reflected light.

Figure 8:
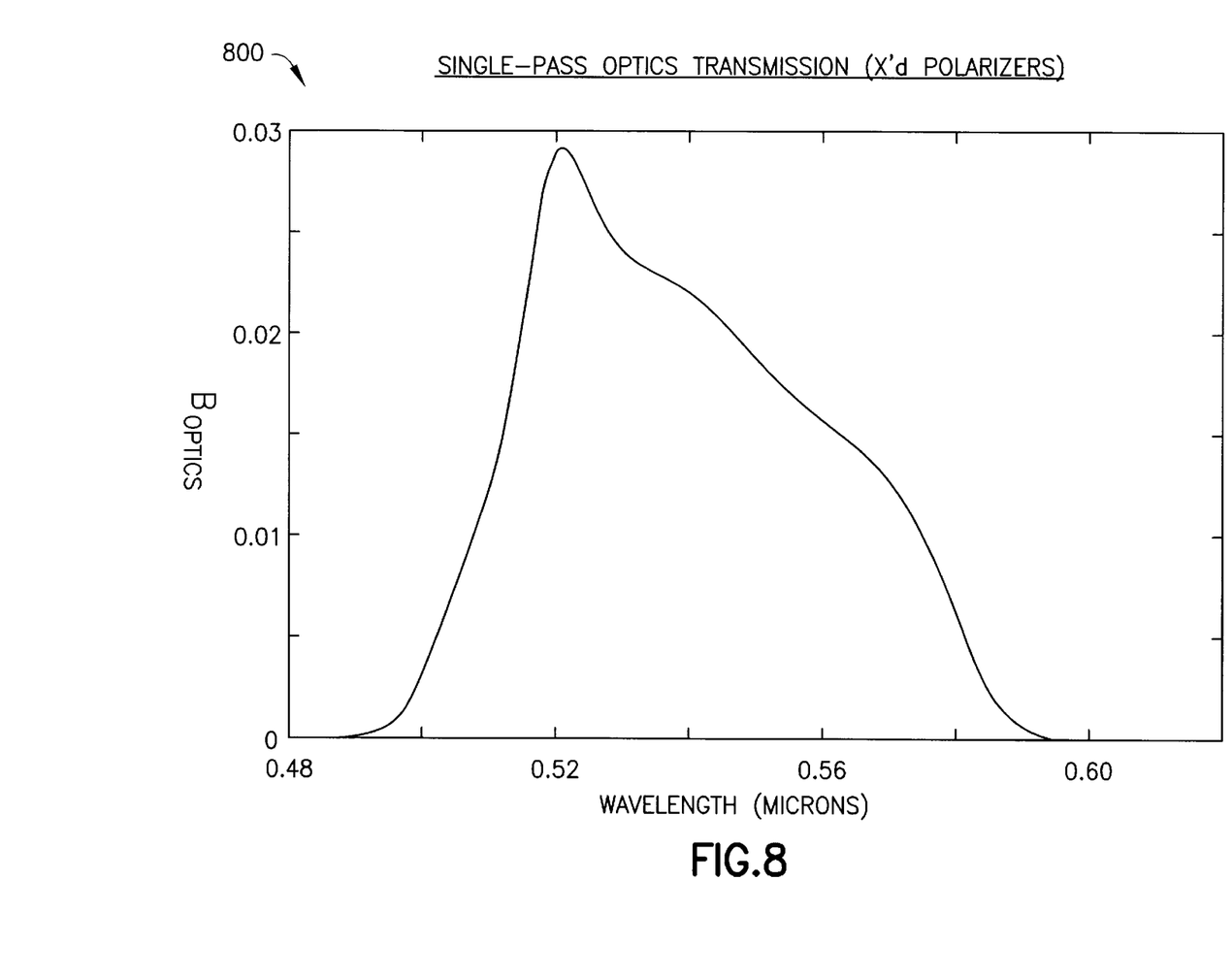
FIG. 8 shows the single-pass crossed polarizer transmission of the FIG. 7 optical system, in the green (center) channel.

FIG. 8 shows a plot 800 of the single pass transmission in the center channel (green) of the system as a function of wavelength, through crossed polarizers at NA=0.167 (f/3). The coatings used in the calculation are as follows:

| Front Prism AR AIR | | Middle Prism AR AIR | | Front Prism Dichroic AIR | | Middle Prism Dichroic Cement | |
|---|---|---|---|---|---|---|---|
| Material | Thickness | Material | Thickness | Material | Thickness | Material | ThickneSS |
| L | 89.38 | L | 109.19 | L | 152.89 | H | 40.53 |
| H | 108.03 | H | 69.33 | H | 61.30 | L | 56.94 |
| M | 46.51 | M | 18.88 | L | 36.22 | H | 65.06 |
| L | 20.00 | H | 50.99 | L | 79.37 | L | 84.49 |
| M | 20.00 | L | 15.00 | L | 38.81 | H | 40.44 |
| SK5 Glass | | H | 130.89 | H | 79.37 | L | 113.05 |
| | | L | 30.48 | L | 38.81 | H | 40.44 |
| | | H | 18.20 | H | 79.37 | L | 113.05 |
| | | SK5 Glass | | L | 38.81 | H | 40.44 |
| | | | | H | 79.37 | L | 113.05 |
| | | | | L | 38.81 | H | 40.44 |
| | | | | H | 79.37 | L | 113.05 |
| | | | | L | 38.81 | H | 40.44 |
| | | | | H | 79.37 | L | 113.05 |
| | | | | L | 38.81 | H | 40.44 |
| | | | | H | 79.37 | L | 113.05 |
| | | | | L | 38.81 | H | 40.44 |
| | | | | H | 79.37 | L | 113.05 |
| | | | | L | 42.46 | H | 40.44 |
| | | | | H | 63.67 | T | 84.44 |
| | | | | L | 53.33 | H | 65.11 |
| | | | | H | 41.65 | L | 56.94 |
| | | | | SK5 Glass | | H | 40.49 |
| | | | | | | SK5 Glass | |

Film indices assumed in the tabulated coatings are $n_H=2.3$, $n_M=1.9$ and $n_L=1.47$.

Figure 9:
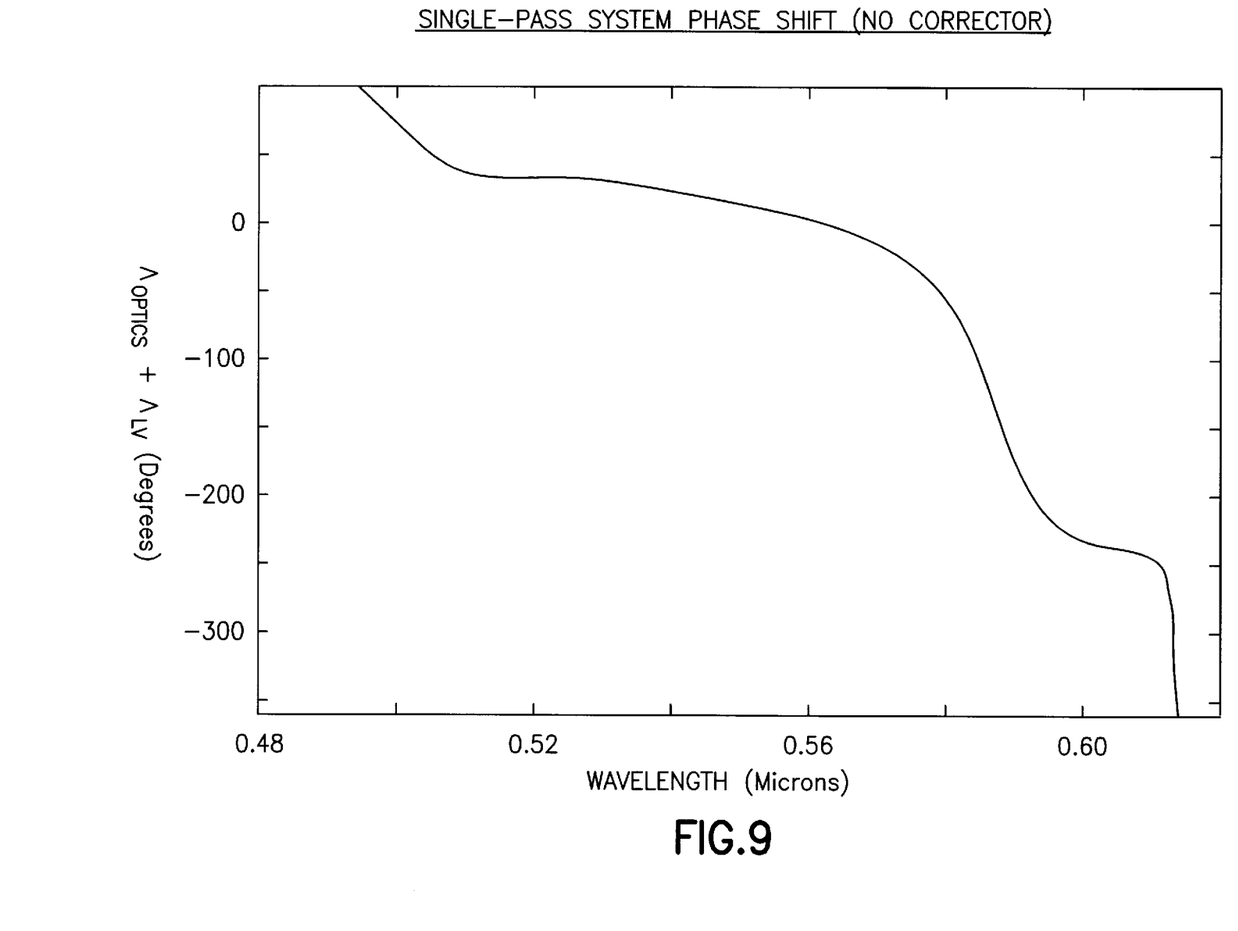
FIG. 9 shows the combined single-pass depolarization phase shift of the FIG. 7 optical system (green channel)

The single-pass optical performance shown in FIG. 8 is quite poor due to depolarization on transmission through the optical system. Moreover, equation [1] shows that, in principle, the double-pass black state could have an intensity that exceeds the light valve's contribution by up to 4 times the black state intensity seen in single-pass. However, the total single-pass phase shift $\Lambda_{optics}+\Lambda_{LV}$ of the optical system with the TNLC light valve, plotted in FIG. 9, is fairly close to 0 over most of the green band, and hence, holds the $\sin^2$ factor in equation [1] to fairly low levels. The phase shift plotted in FIG. 9 is for the FIG. 7 PBS optics and light valve with no corrective retarder.

Figure 10:
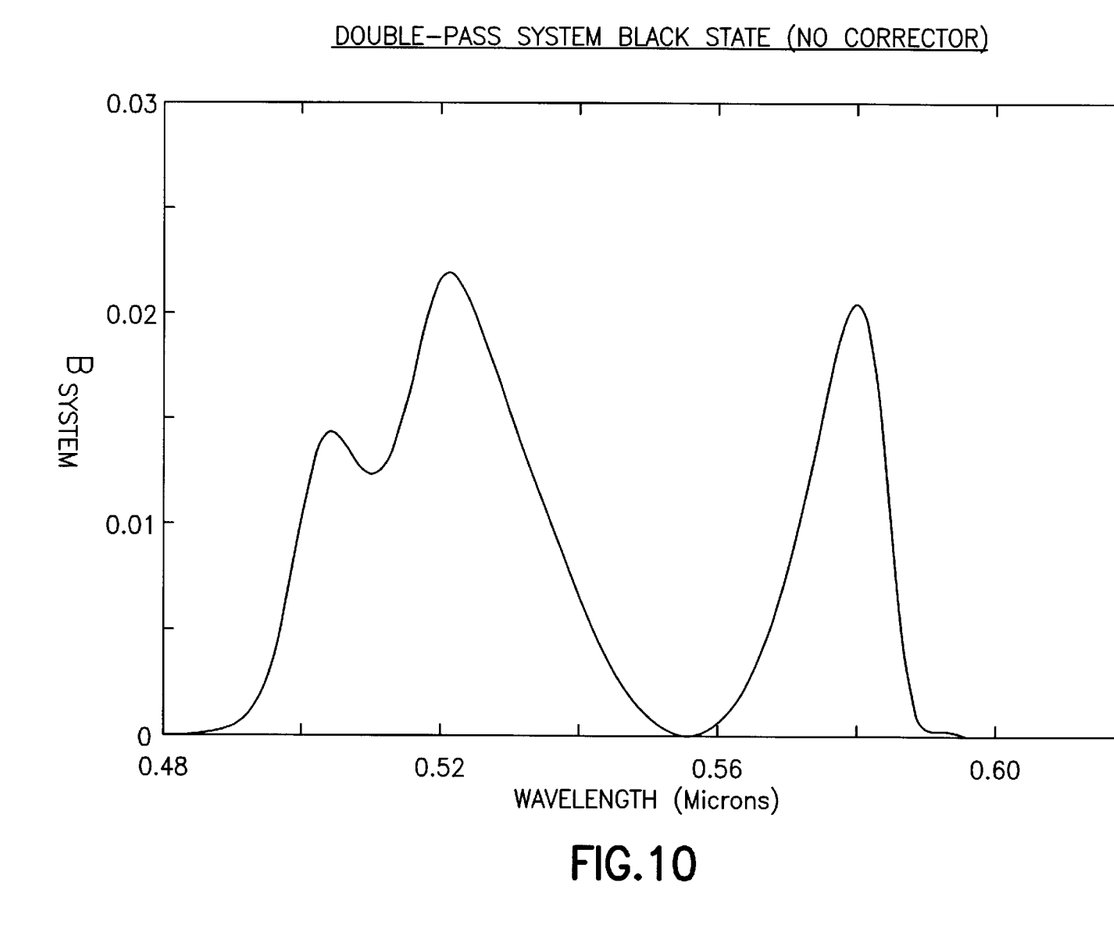
FIG. 10 shows the double-pass system black state of the FIG. 7 system (green channel) if no corrector is used.

The resulting double-pass system contrast is shown in FIG. 10 for the prior art case where no corrective retarder is used. Contrast in double-pass is actually improved over that achieved in single pass, but 300:1 system contrast would not be realized unless the illumination were restricted to a very narrow band, degrading efficiency.

However, the FIG. 10 contrast does not include the corrective plate retarder of the present invention. When the corrective retardance of the phase correcting plate is set substantially equal to the negative of the phase shift plotted in FIG. 9, double-pass system contrast for the system of FIG. 7 is improved to the level of curve A in FIG. 4 (assuming that the correction for the light valve is also addressed as described hereinabove). The plots of FIGS. 8 and 10 do not include the 800:1 incoherent background assumed in FIG. 4. Integrated 300:1 contrast is achieved over a broad green band. Note that arbitrary multiples of 180° can be added to the target retardance given by equation [15]. In this example, the target retardance might be set to 180° plus the negative of the FIG. 9 phase shift.

It is important to recognize that incorporation of a phase correcting plate of the present invention maintains or improves the bright state transmission of the optical system.

Now that the invention has been described by way of a preferred embodiment, various modifications and improvements will occur to those of skill in the art. For instance, the phase correcting plate of the present invention could be embodied as a phase correcting member which includes one or more phase correcting sheets or films. Thus, it should be understood that the preferred embodiment is provided as an example and not as a limitation. The scope of the invention is defined by the appended claims.

We claim:

1. An optical system for a projection display comprising:
    one or more polarizing beam splitters;
    one or more reflective light valves disposed to receive light transmitted through the one or more splitters; and
    one or more phase correcting members, each disposed between the one or more splitters and the one or more light valves, and each adapted to correct for a phase shift between polarization components of the light directed onto the light valve introduced by the splitter and by the light valve.

2. The optical system of claim 1 wherein the one or more polarizing beam splitters is a single beam splitter and wherein the system further comprises one or more optical elements, one or more of which are disposed between the splitter and each of the light valves for directing the light to the light valves.

3. The optical system of claim 2 wherein the one or more optical elements include one or more prisms.

4. The optical system of claim 2 wherein the one or more optical elements include one or more dichroic mirrors.

5. The optical system of claim 1 wherein the one or more polarizing beam splitters include one polarizing beam splitter, the one or more light valves include one light valve and the one or more phase correcting members include one phase correcting member disposed between the splitter and the light valve.

6. The optical system of claim 1 wherein the phase correcting member is adapted to introduce a relative retardation between polarization components of the light directed onto the reflective light valve, the retardation being substantially the negative of a depolarization phase introduced by the splitter and by the light valve.

7. The optical system of claim 6 wherein the phase correcting member is adapted to introduce a relative retardation between polarization components of the light directed onto the reflective light valve, over a range of wavelengths.

8. The optical system of claim 1 wherein the one or more reflective light valves include one or more polarization-modulating light valves.

9. The optical system of claim 1 wherein the display creates a virtual image.

10. The optical system of claim 1 wherein each of the phase correcting members include a plurality of phase correcting sheets or films.

11. The optical system of claim 1 wherein bright state transmission is maintained or improved.

12. The optical system of claim 1 wherein black state light leakage is reduced.

13. A method for improving the optical interaction between a polarizing beam splitter and a reflective light valve so as to reduce reflectivity of dark state light, comprising the step of introducing a relative retardation between polarization components of light directed onto the reflective light valve, the retardation being substantially the negative of a depolarization phase introduced by the beam splitter and by the light valve.

14. The method of claim 13 wherein the reflective light valve is a polarization-modulating light valve.

15. The method of claim 13 wherein the introducing step comprises the step of introducing, with a phase correcting plate located between the beam splitter and the light valve, a relative retardation between polarization components of light directed onto the reflective valve, said phase correcting plate being adapted to correct for a phase shift between said polarization components introduced by the splitter and by the light valve.

16. The method of claim 13 wherein the introducing step comprises the step of introducing a relative retardation between polarization components of light directed onto the reflective light valve, over a range of wavelengths.

* * * * *